(12) United States Patent
Yang

(10) Patent No.: US 8,219,162 B2
(45) Date of Patent: Jul. 10, 2012

(54) ELECTRONIC DEVICE

(75) Inventor: Wen-Yan Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 401 days.

(21) Appl. No.: 12/507,091

(22) Filed: Jul. 22, 2009

(65) Prior Publication Data

US 2010/0298036 A1 Nov. 25, 2010

(30) Foreign Application Priority Data

May 21, 2009 (CN) .......................... 2009 1 0302510

(51) Int. Cl.
*H04M 1/00* (2006.01)
(52) U.S. Cl. ................. 455/575.4; 361/679.01
(58) Field of Classification Search ................. 368/255, 368/73, 88, 276; 345/84; 455/575.4; 968/970, 968/878, 503; 174/359; 428/13
See application file for complete search history.

(56) References Cited

U.S. PATENT DOCUMENTS

| | | | |
|---|---|---|---|
| 4,657,328 A * | 4/1987 | Matsuoka | 439/331 |
| 7,358,502 B1 * | 4/2008 | Appleby et al. | 250/370.14 |
| 2002/0058529 A1 * | 5/2002 | Horie et al. | 455/556 |
| 2005/0009582 A1 * | 1/2005 | Vooi-Kia et al. | 455/575.4 |
| 2005/0180562 A1 * | 8/2005 | Chiang | 379/445 |
| 2006/0137966 A1 * | 6/2006 | Kato | 200/512 |
| 2006/0154136 A1 * | 7/2006 | Ge et al. | 429/97 |
| 2006/0184593 A1 * | 8/2006 | Cho | 708/100 |
| 2006/0256958 A1 * | 11/2006 | Duan et al. | 379/433.01 |
| 2008/0298026 A1 * | 12/2008 | Wang et al. | 361/728 |

* cited by examiner

*Primary Examiner* — Nick Corsaro
*Assistant Examiner* — Mahendra Patel
(74) *Attorney, Agent, or Firm* — Altis Law Group, Inc.

(57) ABSTRACT

An electronic device, comprising: a main body, a back cover, and a button; wherein, the main body comprises a bottom portion and a side wall extending therefrom, a first through hole is defined on the bottom portion, and a second through hole is defined in the side wall; the button comprises a base and a sliding body connected to the base which is caused to generate an elastic deformation under external force, the base is secured to the bottom portion of the main body, and the sliding portion is received in and exposed from the second through hole; the back cover includes an inner surface and a hook protruding from the inner surface, a hook portion is formed on an end of the hook away from the back cover; when the back cover is connected to the main body, the hook is passed through the first through hole, the hook portion is engaged to the base of the button; when the sliding body is pushed, it causes the base to generate the elastic deformation to make the base disengage the hook.

6 Claims, 4 Drawing Sheets

ELECTRONIC DEVICE

BACKGROUND

1. Technical Field

The present disclosure relates to an electronic device.

2. Description of Related Art

In general, electronic devices, such as mobile phones, include a demountable back cover, a user can open the back cover, and make an battery replacement operation for the electronic device.

In the related art, the back cover is usually connected to the electronic device by clasping manner. When opening the back cover, the user can use a hand to push the back cover to make the back cover disengage the electronic device via a sliding manner. However, a long glide makes a touching surface between the electronic device and the back cover becoming smooth, it result in the back cover easily and unintended disengaging from the electronic device.

DETAILED DESCRIPTION

Figure 1:
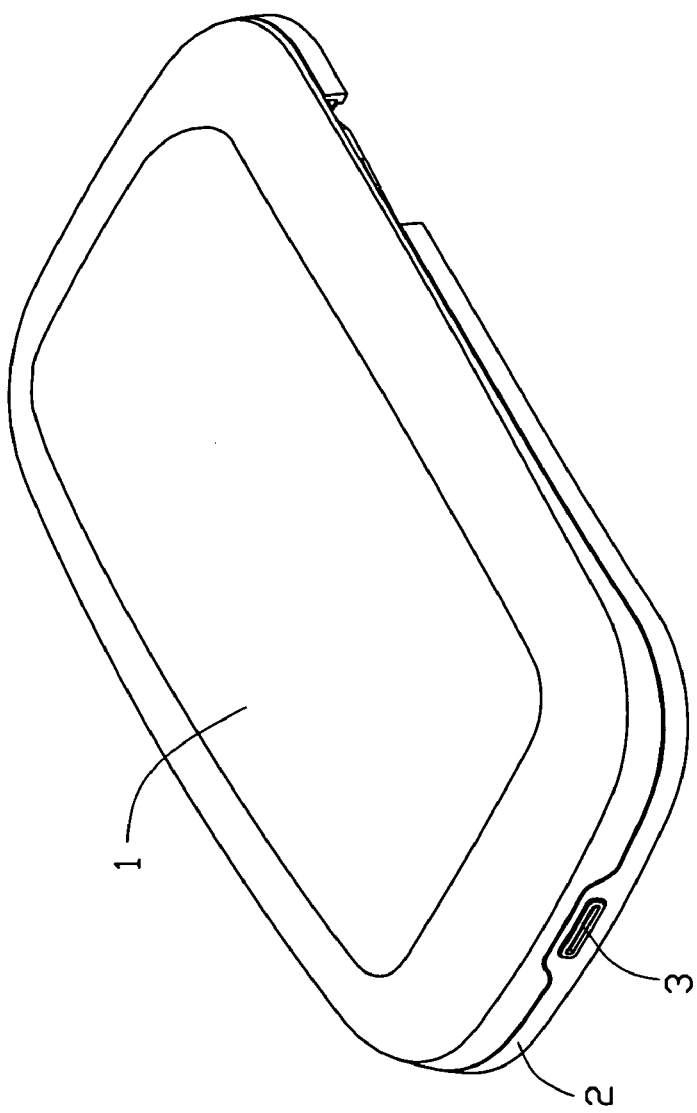
FIG. 1 is an isometric view of an electronic device in accordance with an exemplary embodiment.

FIG. 1 is an isometric view of an electronic device in accordance with an exemplary embodiment. The electronic device includes a back cover 1, a main body 2, and a button 3. In the exemplary embodiment, the electronic device is a mobile phone.

Figure 2:
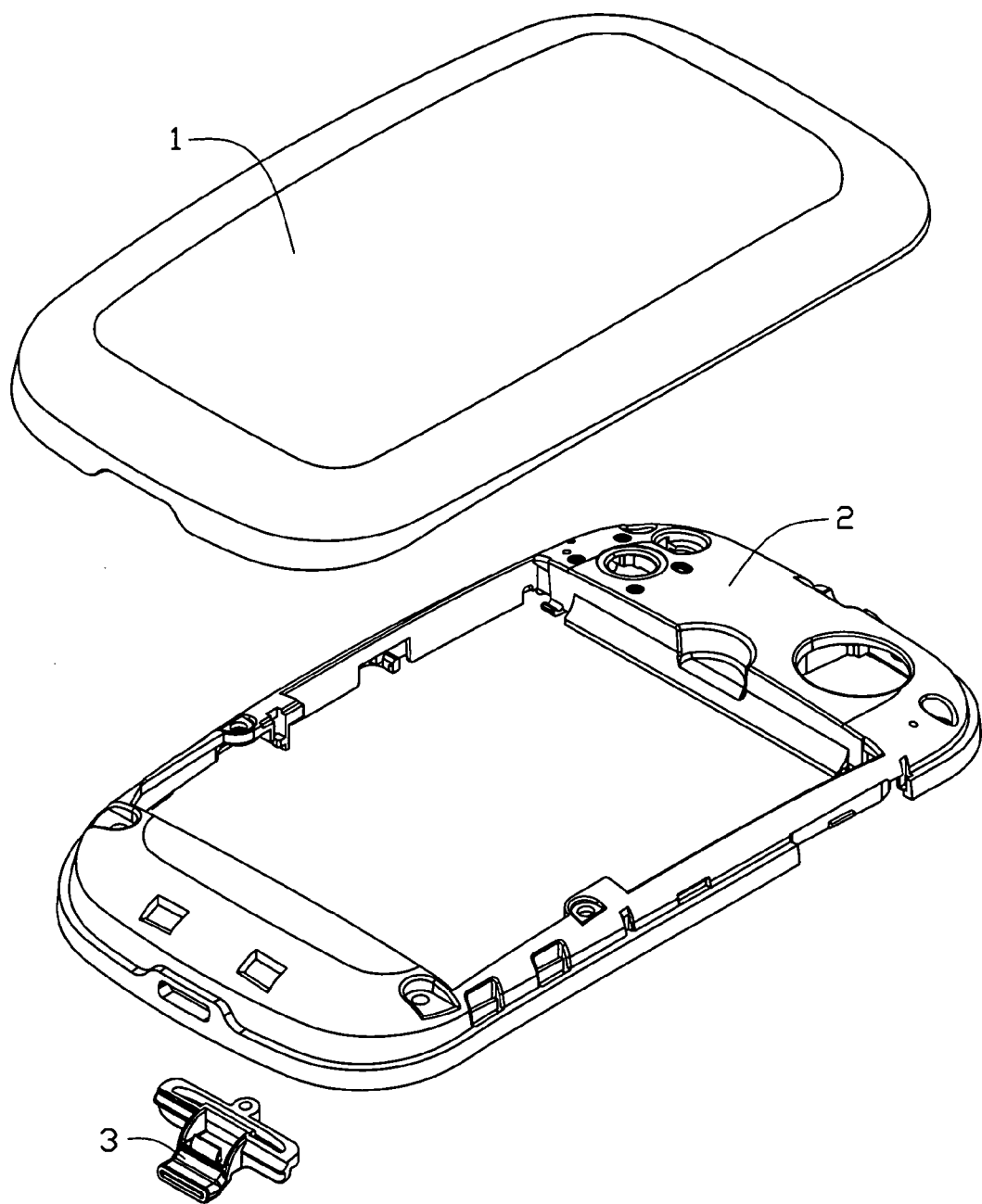
FIG. 2 is an exploded view of the electronic device of FIG. 1.
Figure 3:
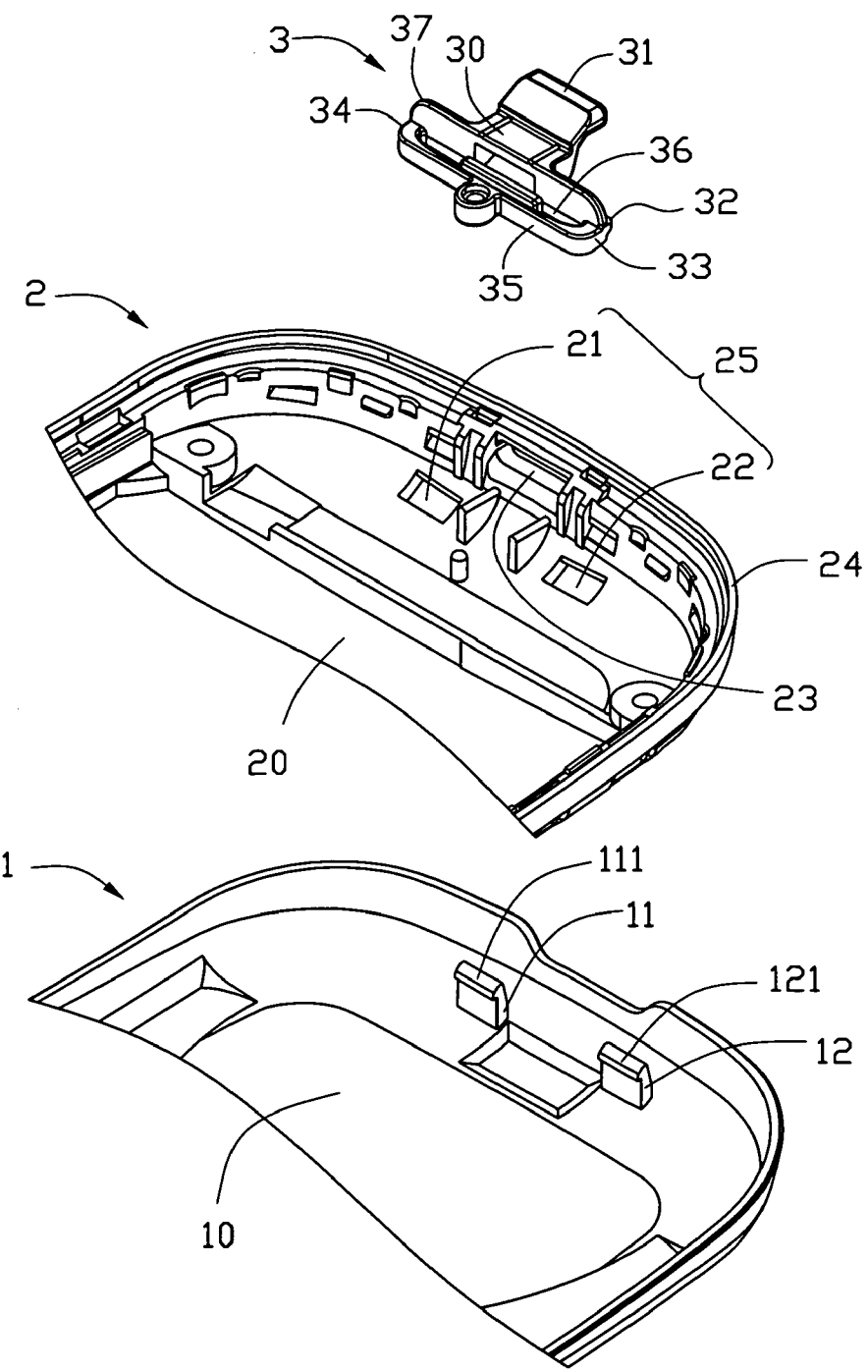
FIG. 3 is another exploded view of the electronic device of FIG. 1.

Referring to FIGS. 2 and 3, the back cover 1 is generally rectangular in shape and includes an inner surface 10 and a hook protruding from the inner surface 10. In the exemplary embodiment, the back cover 1 includes a hook 11 and a hook 12, which have the same construction. A hook portion 111 is formed on end of the hook 11 away from the back cover 1. A hook portion 121 is formed on end of the hook 12 away from the back cover 1.

The main body 2, which includes a bottom portion 20 and a side wall 24 extending from peripheries of the bottom portion 20, is generally rectangular in shape. A number of first through holes 25 are defined on the bottom portion 20 and whose number equals to the number of the hooks. In the exemplary embodiment, two first through holes 21, 22 are defined on the bottom portion 20, corresponding to the two hooks 11 and 12.

A second through hole 23 is defined in the side wall 24. In the exemplary embodiment, the first through holes 21, 22 and the second through hole 23 may be rectangle holes. The second through hole 23 has been approximately placed on a middle line perpendicular to the line connection the two first through holes 21 and 22. In other embodiments, the first through hole 21, 22 and the second through hole 23 may be other shapes, such as, rotundity, square etc. The second through hole 23 may be not placed on the middle line perpendicular to the line connection the two first through holes 21 and 22.

The button 3, which includes a base 30 and a sliding body 31 connected thereto, may be made from plastic. The base 30 includes a colliding surface 32. In the exemplary embodiment, the colliding surface 32 is a curved surface (see FIG. 4) formed by a portion of the base 30 protruding upwards from one side. The colliding surface 32 is configured to firmly engage with the hooks 11 and 12. A left side wall 33, a right side wall 34, an elastic wall 35, and a back wall 37, which join together to form a hollow area 36, are formed on an opposite side of the base 30. The hollow area 36 is configured to provide a moving space for the back wall 37. When the back wall 37 moves towards the elastic wall 35, it will cause the elastic wall 35 to generate an elastic deformation. The sliding body 31 is extended from the back wall 37 to a direction away from the elastic wall 35. In other embodiments, the base 30 may be other shapes, which can make the base 30 have elasticity.

In assembly, the button 3 is connected to the bottom portion 20. Specifically, the base 30 is secured to the bottom portion 20, and the sliding body 31 is received in the second through hole 23 of the side wall 30 of the main body 2. In the exemplary embodiment, the base 30 is secured to the bottom portion 20 by fusing. In other embodiment, the base 30 may be secured to the bottom portion 20 by jointing, or by splicing etc.

Figure 4:
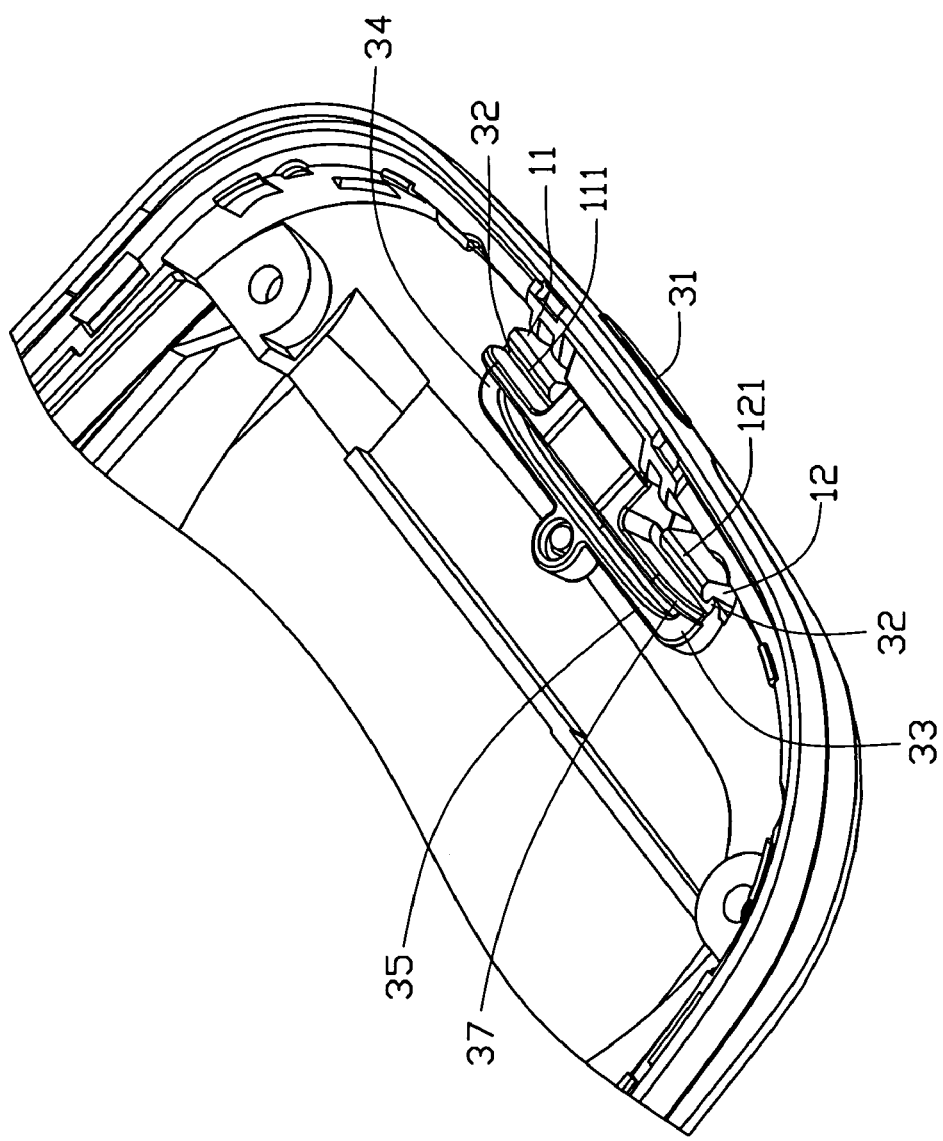
FIG. 4 is a partial, enlarged view of the electronic device of FIG. 1.

Referring to FIG. 4, when the back cover 1 is connected to the main body 2, the hook 11 and the hook 22 are passed through the first through hole 21 and the first through hole 22, respectively. The hook portion 111 and the hook portion 121 are engaged with the colliding surface 32 of the base 30 of the button 3.

When a user wants to remove the back cover 1 from the main body 2, the user can push the sliding body 31 of the main body 2 via the second through hole 23. The back wall 37 moves toward the elastic plate 35 by the sliding body 31. When the back cover 37 moves a predetermined distance, it will cause the elastic plate 35 to generate the elastic deformation to make the colliding surface 32 to disengage the hook portion 111 and the hook portion 121, so as that, the back cover 1 is disengaged from the main body 2. After the user has released the outing force, the elastic plate 35 resumes its original shape to make the colliding surface 32 returns to its original position.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising: a main body, a back cover, and a button for opening and closing the back cover; wherein, the main body comprises a bottom portion and a side wall extending therefrom, a first through hole is defined on the bottom portion, and a second through hole is defined in the side wall;

the button is connected to the bottom portion and comprises a base and a sliding body connected to the base which is caused to generate an elastic deformation under external force, the base is secured to the bottom portion of the main body, and the sliding body is received in and exposed from the second through hole; a colliding surface is formed on the base of the button, the base comprises an elastic wall, a left side wall, a right side wall, and a back wall which forms a hollow portion; the sliding body is connected to the back wall;

the back cover includes an inner surface and a hook protruding from the inner surface, a hook portion is formed on an end of the hook away from the back cover and engaged to the colliding surface; wherein the colliding surface is a curved surface;

when the back cover is connected to the main body, the hook is passed through the first through hole, the hook portion is engaged to the base of the button;

when the sliding body is pushed, the back wall moves towards the elastic wall which is deformed to cause the colliding surface to disengage from the hook.

2. The electronic device as described in claim 1, wherein the button is made from plastic.

3. The electronic device as described in claim 1, wherein the button is secured to the main body by fusing.

4. The electronic device as described in claim 1, wherein the electronic device is a mobile phone.

5. The electronic device as described in claim 1, wherein the colliding surface is a curved surface formed by an portion of the base extending upwards from one side of the base.

6. The electronic device as described in claim 1, wherein the first through hole and the second through hole are rectangle holes.

* * * * *